April 18, 1939.    M. FUJIURA    2,155,184
ORCHARD HEATER
Filed Nov. 26, 1937
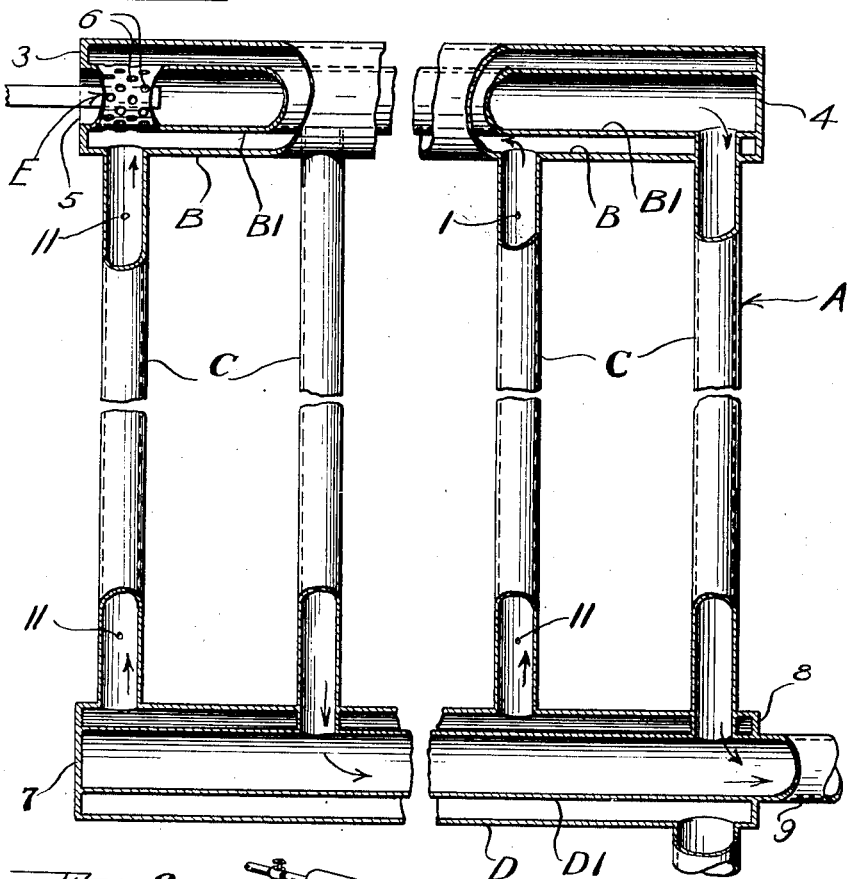
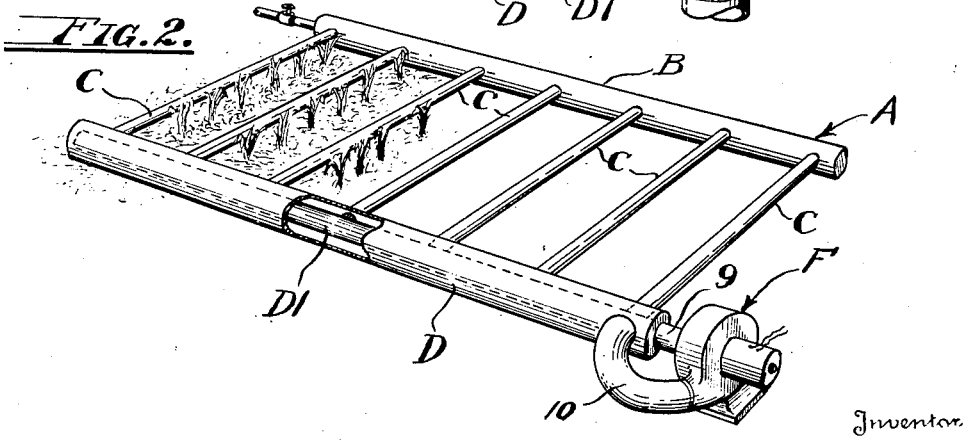
Inventor.
Motoi Fujiura
By Edward M. Kajima
Attorney Patented Apr. 18, 1939

2,155,184

UNITED STATES PATENT OFFICE 2,155,184

ORCHARD HEATER

Motoi Fujiura, San Francisco, Calif.

Application November 26, 1937, Serial No. 176,511

6 Claims. (Cl. 47—2)

This invention relates to an improved heating apparatus for protecting trees, plants and like growths from frost and promoting plant growth, and an object of the invention is to provide a simply constructed and inexpensive, heat radiating frame which is adapted to be upon or be supported close to the ground around and adjacent to the trees or plants to be protected whereby the heat will be distributed over and arise from the area encompassed by and adjacent to the radiating frame in such manner as to most effectively prevent frost damage to and promote growth of said trees and plants lying within and adjacent to said frame.

Another object is to provide a heater of the character described which takes the form of a skeleton heat radiating frame wherein steam or the products of combustion of a burner or heated air from any suitable source, is introduced into and circulated through tubular frame members constructed and arranged to provide for a maximum and uniform heat radiation from approximately ground level and over a wide area.

Another object is to provide an orchard heating radiation wherein a series of pipes or conduits may be connected to form a heat radiating frame with the pipes in rows and spaced apart to correspond to rows or beds of plants or trees, whereby to facilitate a better and more direct application of protective heat to such rows of trees or plants.

The invention is characterized by other advantages and features some of which, with the foregoing will be set forth at length in the following description where I shall outline in full that form of my invention which is selected for illustration in the accompanying drawing. It is to be understood that I do not limit myself to the form shown in said drawing and described herewith, inasmuch as the invention as defined in the claims hereto appended may be embodied in various forms.

In the drawing,

Fig. 1 is a fragmentary top plan view of the heater of this invention and,

Fig. 2 is a perspective view showing the application to a bed of plants arranged in rows.

In one embodiment of this invention I provide a heater consisting of a skeleton or open framework A formed of pipes or conduits B, BI, C, D, and DI and having heat creating or heat introducing means E and a motor driven blower F for circulating the heat through the pipes whereby an effective and uniform heat radiation takes place throughout said framework. This framework is adapted to be laid flatwise or horizontally on the ground or close thereto so that the heat that is radiated will be applied close to the roots of the plants and trees and will rise and envelop the limbs, foliage, fruit, etc., in a particularly uniform and thorough manner whereby to more effectively protect and promote growth of the trees or plants and to apply thereto substantially all of the radiated heat.

By having the pipes C in rows corresponding or similar to the spacing of rows of trees or plants, a more direct and effective application of heat to the trees or plants will be provided. It will be noted that can be done by spacing the pipes C as required.

As here provided the means E is shown as a burner, but it is noted that any means for introducing steam or hot air or any heat providing means could be used.

The pipes B and BI and D and DI serve as heaters wherein the pipes BI and DI are of considerably less diameter than pipes B and D and lie within the latter. Pipe B is closed at both ends by walls 3 and 4 whereas pipe BI is closed at one end by wall 4 and at its other end is opened to the atmosphere by means of the opening 5. The burner or means E extends through the opening 5 a short distance into pipe BI. Adjacent to but spaced inwardly from its open end, pipe BI has recirculating openings 6 formed therein to allow heated fluid to pass from pipe B into pipe BI as will be hereinafter described.

The arrangement of pipes D and DI is such that a wall 7 closes certain corresponding ends of said pipes whereas a wall 8 closes pipe D but has an extension 9 of pipe DI projected therefrom to the intake side of the motor driven blower F. The outlet side of blower F is connected by a pipe 10 with the pipe D adjacent to the wall 7.

The pipes C are laid in spaced parallel relation between and secured to pipes B and D, and every other one of the pipes C beginning with the 2nd one from the left (see Fig. 1) is communicated at its ends with the interior pipes, BI and DI only, whereas the other of the pipes C are communicated with the interior of pipes B and D only and certain of the pipes C may be provided with small vents II to prevent high pressures and excessive heat in the system.

It will now be seen that when the means E introduces steam, or products of combustion etc. into pipe BI, the gaseous heated fluid thus produced will pass inwardly of said pipe while drawing atmospheric air into said pipe through the opening 5. At the same time the motor driven blower F induces the flow of the heated gaseous fluids through the pipes C which communicate the interior pipes BI and DI with one other. The blower thus draws this heated fluid from the said pipes and pipe extension 9 and forces it through pipe 10 back into the system, through pipe D and the other pipes C to the pipe B where through the openings 6 this circulated fluid is drawn into the pipe BI and again heated and, circulated as before noted. It is seen that this continuous circulation of heated fluid causes the pipes of the system to become highly heated and to radiate heat throughout the entire area of the frame A in the effective manner and for the purposes herein before noted.

It should be noted that this heater may be used to heat plants to promote the growth thereof as well as for protecting the plants from freezing temperatures.

I claim:

1. An orchard heater including a framework formed of interconnected pipes adapted to circulate a heated gaseous fluid and to radiate heat when laid upon the ground, certain of said pipes being disposed in spaced parallel relation and connected at their ends with other pipes which extend at right angles thereto, means for providing a heated gaseous fuel and introducing the same into one of the pipes, and a motor operated blower for circulating said fluid through said pipes.

2. An orchard heater comprising spaced outer pipes, inner pipes of smaller diameters than and extending lengthwise within the outer pipes, a plurality of pipes arranged in spaced relation between and communicating at their ends with said outer pipes and inner pipes, means for providing a heated gaseous fluid at one end of one of said inner pipes, and a motor operated blower connected with one end of the other inner pipe and with the adjacent end of one of said outer pipes for circulating the fluid through all of said pipes.

3. An orchard heater, comprising an outer pipe closed at both ends, an inner pipe of smaller diameter than and extending substantially the length of and within said outer pipe, said inner pipe having one end closed by one end of said outer pipe and its other end open to the atmosphere through the other closed end of said outer pipe, said inner pipe having openings therein spaced inwardly from its open end for communicating the interior thereof with the interior of said outer pipe, a means extending into said open end for providing a heated gaseous fluid in said inner pipe, a second outer pipe spaced from but lying in the plane of the first named outer pipe, a group of spaced pipes extending between and connected at their ends with said outer pipes for communicating said outer pipes with one another, a second inner pipe within said second outer pipe, means closing certain corresponding ends of second inner and outer pipes, means closing the other end of said second outer pipe, a second group of connecting pipes connected at their ends with and communicating said first and second named inner pipes with one another, and a blower connected to said second inner and outer pipes for circulating said fluid through all of said pipes.

4. An orchard heater, comprising an outer pipe closed at both ends, an inner pipe of smaller diameter than and extending substantially the length of and within said outer pipe, said inner pipe having one end closed by one end of said outer pipe and its other end open to the atmosphere through the other closed end of said outer pipe, said inner pipe having openings therein spaced inwardly from its open end for communicating the interior thereof with the interior of said outer pipe, a means extending into said open end for providing a heated gaseous fluid in said inner pipe, a second outer pipe spaced from but lying in the plane of the first named outer pipe, a group of spaced pipes extending between and connected at their ends with said outer pipes for communicating said outer pipes with one another, a second inner pipe within said second outer pipe, means closing certain corresponding ends of second inner and outer pipes, means closing the other end of said second outer pipe, a second group of connecting pipes connected at their ends with and communicating said first and second named inner pipes with one another, a blower connected to said second inner and outer pipes for circulating said fluid through all of said pipes, and all of said pipes lying in substantially the same plane, said first named group of pipes having vent openings therein.

5. An orchard heater, compriisng an outer pipe closed at both ends, an inner pipe of smaller diameter than and extending substantially the length of and within said outer pipe, said inner pipe having one end closed by one end of said outer pipe and its other end open to the atmosphere through the other closed end of said outer pipe, said inner pipe having openings therein spaced inwardly from its open end for communicating the interior thereof with the interior of said outer pipe, a means extending into said open end for providing a heated gaseous fluid in said inner pipe, a second outer pipe spaced from but lying in the plane of the first named outer pipe, a group of spaced pipes extending between and connected at their ends with said outer pipes for communicating said outer pipes with one another, a second inner pipe within said second inner and outer pipe, means closing certain corresponding ends of second inner and outer pipes, means closing the other end of said second outer pipe, a second group of connecting pipes connected at their ends with and communicating said first and second named inner pipes with one another, a blower connected to said second inner and outer pipes for circulating said fluid through all of said pipes, and said blower having its intake side connected with the other end of said second inner pipe and its outlet side connected with an adjacent portion of said second named outer pipe.

6. An orchard heater, comprising spaced pipes, other pipes lying adjacent and parallel with the first named pipes, a plurality of parallel cross pipes connected at their ends with and extending at right angles to said first and second named pipes, means for providing a heated gaseous fuel at one end of one of the second named pipes, and a blower connected with certain of the first and second named pipes for circulating said fluid through all of said pipes.

MOTOI FUJIURA.